June 24, 1930.   L. G. EDGCOMB   1,766,707
DEVICE FOR BUNTING BARS AND MUNTINGS IN SASH AND DOOR CONSTRUCTIONS
Filed Jan. 5, 1929
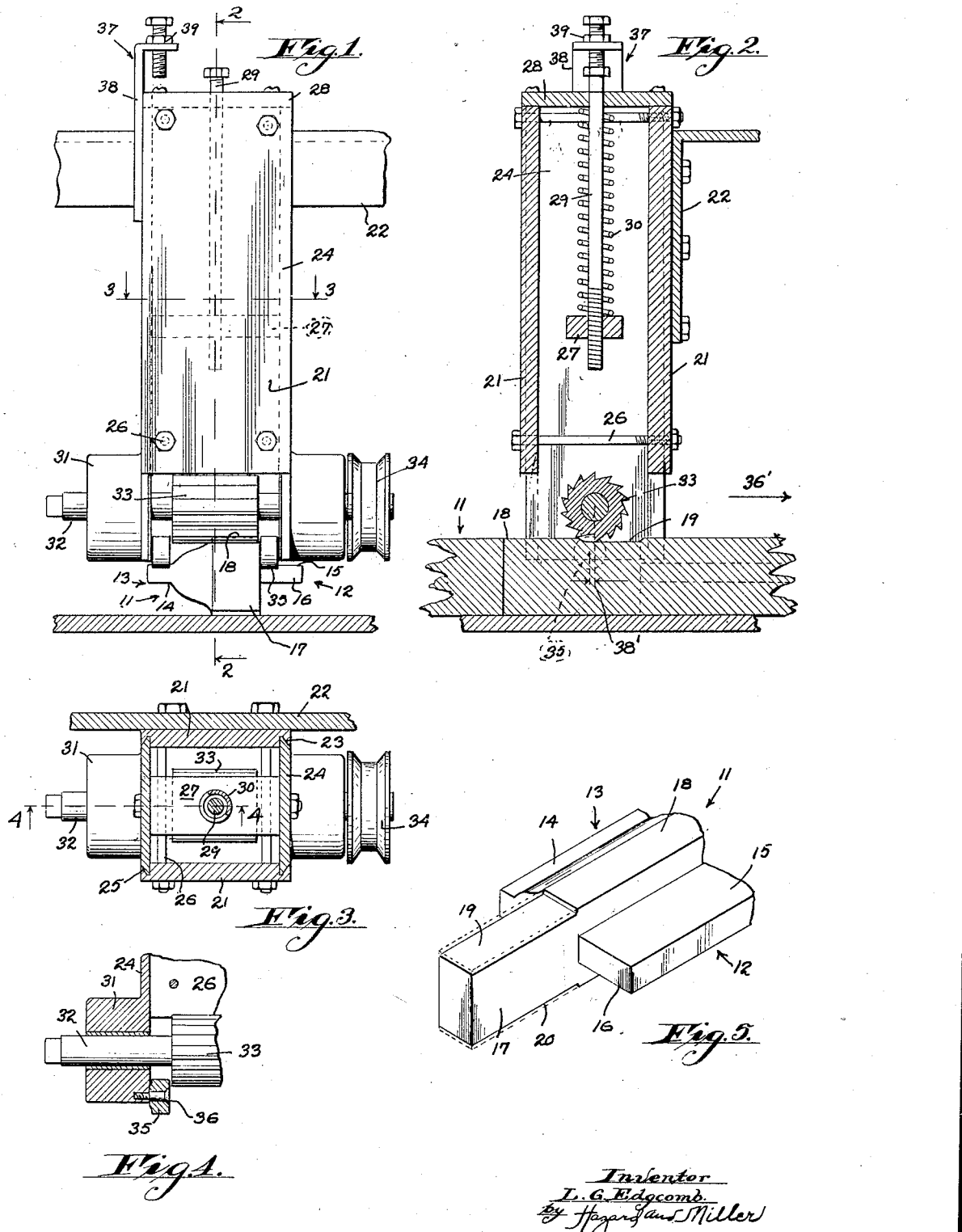

Patented June 24, 1930

1,766,707

UNITED STATES PATENT OFFICE

LEON G. EDGCOMB, OF PASADENA, CALIFORNIA

DEVICE FOR BUNTING BARS AND MUNTINGS IN SASH AND DOOR CONSTRUCTIONS

Application filed January 5, 1929. Serial No. 330,554.

My invention is a device for bunting bars and muntings in sash and door constructions.

In the prior practice it has been the custom to manually bunt, that is, trim down the ends of bars and muntings of sash and doors to form a tenon-like structure for a mortise type of joint. This has been found to give an inaccurate fit and the trimming of the bars and muntings in the bunting operation has not been uniform.

An object of my invention is to trim down or bunt the ends of the bars and muntings for sash and door or similar construction by a machine which only cuts at the part to be bunted or trimmed.

A further detailed object of my invention is using a rotary cutter of a type utilized in woodworking, this being mounted on a slightly shiftable shaft and the shaft being guided by rollers running on the tongue and molding of a bar or munting and the rollers dropping at the end of the tongue and molding, allowing the cutter to engage one face of the bar and therefore trim or bunt the end.

Another detailed object of my invention is in having the rollers arranged to ride on an approaching end of a bar or munting and thereby raise the cutter so that it clears the side of the bar or munting while the bars or muntings are passing through a sticking machine.

In constructing my invention I utilize a carrying housing which may be attached to part of a woodworking machine and preferably to a sticker. This has slidable side panels having a slight vertical motion and at the lower portion of these side panels the shaft having the rotary central cutter is journaled. These shafts are mounted in journals which have supporting wheels adapted to run on the tongue and on the outside portion of the molding of a bar or munting.

The shaft having the cutter may be driven in any suitable manner, giving it a rotary motion and when the rollers run off the end of the tongue or molding adjacent the end of a bar or munting, the cutter may drop slightly and therefore trim or bunt the end of the bar or munting. The downward drop is limited by the motion of the side plates.

My invention is illustrated in the accompanying drawings, in which:

Figure 1 is an elevation of my invention, showing a bar or munting end on and illustrating the cutter in operation;

Fig. 2 is a vertical section on the line 2—2 of Fig. 1 in the direction of the arrows;

Fig. 3 is a horizontal section on the line 3—3 of Fig. 1 in the direction of the arrows;

Fig. 4 is a detailed section on the line 4—4 of Fig. 3;

Fig. 5 is a perspective view of a bar or munting showing the trimmed or bunted end.

In the drawings, a bar or munting is designated generally by the numeral 11 having a tongue 12 extending along one side and a molding 13 on the opposite side. The tongue is generally flat and the molding generally has a flat surface 14 usually of the same plane as the surface 15 of the tongue. The tongue and the molding terminate as indicated at 16 and the tenon-like end 17 projects. The opposite faces of the bar or munting are designated by the numeral 18 and my invention is designed to trim or bunt the faces 19 of the tenon-like structure. The dotted lines 20 indicate the continuation of the faces 18 showing the full thickness of the bar or munting before the ends 19 are trimmed.

The device I utilize employs face plates 21 one of which may have a clamping device 22 by which the device is attached to a woodworking machine such as a sticker. These face plates have preferably a dove-tailed groove 23 adjacent their edges and in these dove-tailed grooves are fitted side plates 24, such side plates having a bevelled side edge 25. Bolts 26 secure the face plates together and clamp the side plates allowing however, sufficient freedom for sliding of the side plates. The side plates are connected at the bottom by a transverse partition plate 27 and a top plate 28 is secured to the top of the face plates 21 by screws or the like. A limit or adjusting bolt 29 extends downwardly through the top plate 28 and is screwed in the partition 27, there being a compression spring 30 between the partition and the underside of the top plate, normally tending to thrust the partition and hence the side plates 24 downwardly in reference to the top plate 28 and the face plates 21.

At the lower ends of the side plates 24 there are hubs 31 in which are journaled the counter shaft 32. This shaft has a rotary cutter 33 mounted thereon and is illustrated as being driven by a pulley 34 which is actuated by a belt not illustrated. Any other suitable drive may be applied.

At the bottom of the side plates 24 there are a pair of rollers 35, each mounted on a stud 36. These rollers are adapted to roll on the surface 14 of the molding 13 on one side and the surface 15 of the tongue 12 on the opposite side of the bar or munting and when these rollers engage such surfaces the cutting tool is held slightly above the side surface 18 of the bar or munting. When however, the rollers 35 ride off the ends 16 of the tongues and molding, the cutter drops downwardly, due in part to the weight of the side plates and the cutter and the downward pressure of the spring 30. The cutters then function to trim or bunt the ends 17 of the bar of munting, producing an end, shaped as illustrated in Fig. 5.

The direction of movement of the bars or the muntings is indicated by the arrow 36' in Fig. 2 and it will be noted that the center of the rollers is slightly advanced from the center of the cutters as indicated by the measurement 38'. This allows the rollers and the side pieces to drop before the cutter comes into action. The bars and muntings may be put through my trimming device one after the other in abutting relation. The rollers ride up on the tongue and molding of the next succeeding bar or munting and stop the end trimming. It is necessary to turn the bars or muntings with the reverse side up to trim the opposite sides of the tenon-like structure.

A stop arrangement 37 to limit the downward movement of the cutter utilizes a bracket 38 secured to one of the side plates 24 and having an adjusting screw 39 mounted therein. This screw in the downward motion of the side plate engages the top plate 28 which is rigid with the face plates 21. Hence the drop of the cutter may be accurately adjusted to bunt or trim the tenon-like ends of the bars or muntings to the desired degree.

As above mentioned, the bolt 29 has a loose fit in the top plate 28 and is utilized to retain the cutter upwardly so that it cannot have any cutting function. This is done by merely screwing the bolt further through the partition 27, thus raising the side plates and hence the cutter.

Various changes may be made in the principles of my invention without departing from the spirit thereof as set forth in the description, drawings and claims:

I claim:

1. A device for trimming an edge face of a tenon, comprising means for mounting a cutter, means tending to force said cutter toward the work, a gaging device or devices at the side or sides of the cutter arranged to engage the work laterally of the cutter and maintain the cutter out of engagement therewith but so that as the work passes the device the gaging device passes off a shoulder of the work, the cutter may advance into engagement with the edge of the tenon, and means to limit the advance of the cutter to cause it to trim said edge as the work continues to advance.

2. A device for trimming an edge of a tenon, comprising a rotary shaft mounting a cutter, said shaft being held in suitable journals, means tending to force said cutter towards the work, a plurality of studs mounted in the structure carrying the cutter shaft and having rollers thereon arranged to engage the work laterally of the cutter and forward thereof and retain the cutter out of engagement with the work but so that as the work passes the device the rollers pass off a shoulder of the work and the cutter may advance into engagement with the edge of the tenon, and means to limit the advance of the cutter to cause it to trim the edge of the tenon as the work continues to advance.

3. A device for trimming an edge face of a tenon, comprising in combination a face plate construction with means to fixedly secure same to a machine, a pair of side plates slidably mounted on the face plates, means to urge the side plates downwardly, a cutter shaft journaled in the side plates and having a cutter thereon, a pair of studs on opposite sides of the cutter and secured to the side plates and spaced forward of the cutter shaft, there being a roller on each stud adapted to engage part of the work on opposite sides of the cutter and support said cutter above the work, but so that as the work passes the rollers the said rollers pass off a shoulder of the work and allow the cutter to engage an edge of a tenon, means to limit the advance of the cutter into the work, the said cutter trimming the edge of the tenon as the work advances in reference to the said cutter and the rollers.

In testimony whereof I have signed my name to this specification.

LEON G. EDGCOMB.